No. 610,576. Patented Sept. 13, 1898.
Z. AUGER.
PULLEY AND DEVICE FOR SECURING SAME TO SHAFTS.
(Application filed Sept. 27, 1897.)
(No Model.)

Witnesses:
F. DeWitt Goodwin
S. J. Williamson

Inventor:
Zenas Auger
by Geo. H. Holgate
Attorney

THE NORRIS PETERS CO., PHOTO-LITHO., WASHINGTON, D. C.

UNITED STATES PATENT OFFICE.

ZENAS AUGER, OF MIDDLEBOROUGH, MASSACHUSETTS.

PULLEY AND DEVICE FOR SECURING SAME TO SHAFTS.

SPECIFICATION forming part of Letters Patent No. 610,576, dated September 13, 1898.

Application filed September 27, 1897. Serial No. 653,084. (No model.)

*To all whom it may concern:*

Be it known that I, ZENAS AUGER, a citizen of the United States, residing at Middleborough, in the county of Plymouth and State of Massachusetts, have invented a certain new and useful Improvement in Pulleys and Devices for Securing the Same to Shafts, of which the following is a specification.

My invention relates to a new and useful improvement in pulleys and devices for securing the same to shafts, and has for its object to so construct devices of this description as to securely lock a pulley upon a shaft in any position thereon and at the same time permit its location being changed from one place to another upon the shaft.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
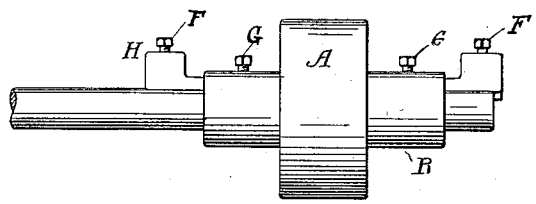
Figure 2:
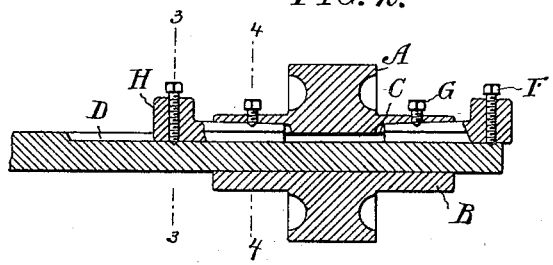
Figure 3:
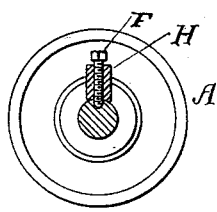
Figure 4:
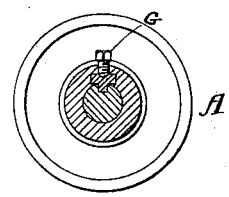
Figure 5:
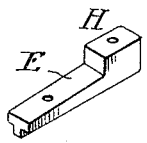

Figure 1 is an elevation of a pulley made in accordance with my improvement; Fig. 2, a longitudinal section of the pulley and shaft; Fig. 3, a section at the line 3 of Fig. 2; Fig. 4, a section at the line 4 of the same figure, and Fig. 5 a detail perspective of one of the keys for securing the pulley in place.

In carrying out my invention as here embodied, A represents the pulley, which may be of any size or design, having formed therewith the hub extensions B, through which is a hole of sufficient size to fit over the shaft upon which the pulley is to be placed, and these extensions also have formed therein the keyways C. A continuous keyway D is formed in the shaft, but is of less width in cross-section than the keyways in the pulley, and the keys E are made of two widths in cross-section, or of the general shape of a T, in order that the narrow portion thereof may fit within the keyway D in the shaft while the broader portion thereof may fit within the keyways C within the hub extension, by which arrangement it is obvious that when the pulley is to be placed in position and two of these keys inserted within the hub extension and the keyway in the shaft the pulley can by no possibility revolve independently of the shaft, and in order that the keys and pulley may not be displaced longitudinally set-bolts F are threaded through the ends of the keys, so as to bear against the bottom of the keyway D, which will effectually hold the keys in position, while the set-screws G are threaded through the hub extensions, so as to bear upon the keys, thereby locking these extensions to the keys, and as the latter are held by the set-bolts F no accidental displacement takes place. Enlargements H are formed upon the ends of the keys in order that these keys may be more readily inserted or withdrawn, thereby facilitating the placing of the pulley or the altering of its position, as will be readily understood.

In practice the pulley is slid upon the shaft to the position desired and so turned as to cause the keyways in the hub extensions to register with the keyway in the shaft, after which the keys are inserted, as before set forth, and secured by proper manipulation of the set-bolts F, and finally the pulley is secured by the proper manipulation of the set-screws G.

Should it at any time become desirable to alter the location of the pulley, this is readily accomplished by releasing the set screws and bolts, withdrawing the keys, sliding the pulley to the altered position, and again inserting and securing the keys.

For convenience the keyway D may be formed in the shaft when the latter is made and before being placed in its bearings, so that thereafter any number of pulleys may be thus located thereon and their position be determined or altered as occasion may require.

If desired, the keys may be tapered so as to be driven home within the keyways, and thereby avoid the necessity of having to use the set-screws, as will be obvious.

Having thus fully described my invention, what I claim as new and useful is—

1. The combination with a shaft having a keyway therein and a pulley having grooves in its hub which correspond in position with the keyway in the shaft, of keys inserted in opposite directions in said keyway and grooves, and set-bolts in the outer ends of said keys adapted to spring the keys outward at their outer ends whereby to lock the pulley securely to the shaft.

2. The combination with a shaft having a keyway therein, and a hub having grooves in its bore opposite the keyway, of keys inserted in said keyway and grooves, from opposite ends of the pulley inward, set-bolts in the keys and the ends of the hub for securing the pulley in position on the shaft.

3. The combination with a shaft having a keyway and a pulley having grooves in its hub, of keys adapted to enter the keyway and grooves, said keys having enlarged outer ends whereby to afford means for readily driving the keys out of the keyway and support for set-bolts, and set-bolts in said enlarged ends.

In testimony whereof I have hereunto affixed my signature in the presence of two subscribing witnesses.

ZENAS AUGER.

Witnesses:
F. EVERITT DALTON,
NORBERT BÉLISLE.